(12) United States Patent
    Maker et al.

(10) Patent No.: US 12,661,595 B2
(45) Date of Patent: *Jun. 23, 2026

(54) POSITION-ADJUSTABLE CONNECTOR FOR MOBILE DEVICE CONTROLLER

(71) Applicant: Backbone Labs, Inc., Vancouver, WA (US)

(72) Inventors: Ozhan Maker, San Diego, CA (US);
Zachary Scott, Palo Alto, CA (US);
Eric Sorensen, Portland, OR (US);
Cory Newton, Palo Alto, CA (US)

(73) Assignee: Backbone Labs, Inc., Vancouver, WA (US)

( * ) Notice: Subject to any disclaimer, the term of this patent is extended or adjusted under 35 U.S.C. 154(b) by 254 days.

This patent is subject to a terminal disclaimer.

(21) Appl. No.: 18/389,063

(22) Filed: Nov. 13, 2023

(65) Prior Publication Data

US 2024/0157258 A1     May 16, 2024

Related U.S. Application Data

(60) Provisional application No. 63/425,655, filed on Nov. 15, 2022.

(51) Int. Cl.
*A63F 13/98*          (2014.01)

(52) U.S. Cl.
CPC .................................... *A63F 13/98* (2014.09)

(58) Field of Classification Search
CPC .......... A63F 13/98; A63F 13/92; A63F 13/24;
A63F 13/23; A63F 2300/1043; A63F
2300/204
See application file for complete search history.

(56) References Cited

U.S. PATENT DOCUMENTS

| | | | |
|---|---|---|---|
| 3,536,908 | A | 10/1970 | Oster |
| 4,636,593 | A | 1/1987 | Novak |
| 6,213,880 | B1 | 4/2001 | Sim |
| 6,238,289 | B1 | 5/2001 | Sobota |
| 6,279,906 | B1 | 8/2001 | Sanderson |
| 6,400,352 | B1 | 6/2002 | Bruneau |

(Continued)

FOREIGN PATENT DOCUMENTS

| | | |
|---|---|---|
| CA | 3169951 A1 | 9/2021 |
| CN | 101739162 A | 6/2010 |

(Continued)

OTHER PUBLICATIONS

US 12,029,974 B1, 07/2024, Maker (withdrawn)

(Continued)

*Primary Examiner* — Kevin Y Kim
(74) *Attorney, Agent, or Firm* — Crowell & Moring LLP

(57)          ABSTRACT

A gaming device that includes a handheld controller with a handle and a mechanism for connecting the handheld controller to a mobile device. The mechanism includes a substantially rigid arm and a connector. The arm is housed within the handle and is configured to pivot about a pivot point within the handle. The connector is attached to the arm at the end opposite the pivot point and is structured to physically and electrically pair the mobile device and the handheld controller. The connector is structured to pivot about the pivot point with the arm.

14 Claims, 4 Drawing Sheets

(56) References Cited

U.S. PATENT DOCUMENTS

| 6,640,268 B1 | 10/2003 | Kumar |
| 6,667,738 B2 | 12/2003 | Murphy |
| 6,684,062 B1 | 1/2004 | Gosior |
| 6,736,724 B1 | 5/2004 | Erikawa |
| 6,761,462 B2 | 7/2004 | Yoshida |
| D500,319 S | 12/2004 | Wada |
| 6,855,057 B2 | 2/2005 | Namba |
| 6,903,662 B2 | 6/2005 | Rix |
| 6,965,368 B1 | 11/2005 | Andrews et al. |
| 7,477,239 B2 | 1/2009 | Ray |
| 7,580,728 B2 | 8/2009 | Vance et al. |
| 7,905,627 B2 | 3/2011 | Chiang |
| 8,368,662 B2 | 2/2013 | Argiro |
| 8,462,810 B2 | 6/2013 | Spinar |
| 8,558,796 B2 | 10/2013 | Giancarlo |
| 8,568,238 B2 | 10/2013 | Walker |
| 8,760,394 B2 | 6/2014 | Chiang |
| 8,822,851 B2 | 9/2014 | Walker |
| 8,972,617 B2 | 3/2015 | Hirschman |
| 9,053,243 B2 | 6/2015 | Townsend |
| 9,158,390 B2 | 10/2015 | Petersen |
| 9,281,859 B1 | 3/2016 | Lee |
| 9,295,915 B2 | 3/2016 | Bruno |
| 9,677,740 B2 | 6/2017 | Steiner |
| 9,700,800 B2 | 7/2017 | Tokita |
| 9,848,324 B1 | 12/2017 | Abene |
| 9,965,116 B1 | 5/2018 | Wolter |
| 10,025,644 B2 | 7/2018 | Iwaya et al. |
| 10,042,480 B2 | 8/2018 | Krahenbuhl |
| 10,254,924 B2 | 4/2019 | Missig |
| 10,258,876 B2 | 4/2019 | Wells et al. |
| 10,259,384 B2 | 4/2019 | Teng |
| 10,272,325 B1 * | 4/2019 | Nevarez ............... A63F 13/98 |
| 10,300,386 B1 | 5/2019 | Leung et al. |
| 10,391,393 B2 | 8/2019 | Townley |
| 10,409,449 B2 | 9/2019 | Takikawa |
| 10,483,969 B2 | 11/2019 | Kontani |
| 10,599,233 B1 | 3/2020 | Amalou |
| 10,725,557 B2 | 7/2020 | Kontani |
| 10,741,215 B1 | 8/2020 | Sundareson |
| 10,751,612 B1 | 8/2020 | Urbanus |
| 10,868,436 B1 | 12/2020 | Chen |
| 10,893,125 B2 | 1/2021 | Ma |
| 10,912,991 B2 | 2/2021 | Buhr |
| 11,000,759 B2 | 5/2021 | Palmer et al. |
| 11,027,191 B2 | 6/2021 | Oh |
| 11,045,723 B1 | 6/2021 | Lee |
| 11,090,557 B2 | 8/2021 | Downs et al. |
| 11,105,969 B2 | 8/2021 | Sasagawa |
| 11,167,209 B2 | 11/2021 | Lu |
| 11,298,614 B2 | 4/2022 | Posin |
| 11,343,354 B2 | 5/2022 | Parekh |
| 11,389,721 B2 | 7/2022 | Khaira et al. |
| 11,395,961 B2 | 7/2022 | Chung |
| 11,467,780 B1 | 10/2022 | Perez Guevara |
| 11,528,363 B2 | 12/2022 | Bohannon |
| 11,528,987 B1 | 12/2022 | Girault |
| 11,534,681 B2 | 12/2022 | Dang |
| 11,607,605 B1 | 3/2023 | Garrett |
| 11,662,855 B1 | 5/2023 | Sorensen et al. |
| 11,707,670 B2 | 7/2023 | Khaira et al. |
| 11,819,756 B2 | 11/2023 | Lu |
| 11,826,642 B2 | 11/2023 | Khaira et al. |
| 11,839,810 B2 | 12/2023 | Khaira et al. |
| 11,853,505 B1 | 12/2023 | Sorensen et al. |
| 12,017,139 B2 | 6/2024 | Vroom |
| 12,028,474 B2 | 7/2024 | O'Leary |
| 12,064,699 B2 | 8/2024 | Miura |
| 12,070,678 B2 | 8/2024 | Maker |
| 12,074,946 B2 | 8/2024 | Wei et al. |
| 12,115,443 B2 | 10/2024 | Khaira |
| 12,121,800 B2 | 10/2024 | Maker |
| 12,145,052 B2 | 11/2024 | Khaira |
| 12,145,053 B2 | 11/2024 | Khaira |
| 12,194,374 B2 | 1/2025 | Khaira |
| 12,263,400 B2 | 4/2025 | Lake et al. |
| 12,268,956 B2 | 4/2025 | Khaira |
| 12,274,933 B2 | 4/2025 | Lu |
| 12,285,676 B2 | 4/2025 | Maker |
| 12,303,775 B2 | 5/2025 | Yeo |
| 12,324,983 B2 | 6/2025 | O'Connor |
| 12,399,615 B2 | 8/2025 | Peng |
| 12,420,178 B2 | 9/2025 | Guerrero |
| 12,427,403 B2 | 9/2025 | Boegli |
| 12,438,949 B2 | 10/2025 | Donlan et al. |
| 12,551,785 B2 | 2/2026 | O'Connor |
| 12,558,612 B2 | 2/2026 | O'Connor |
| 2001/0027130 A1 | 10/2001 | Namba |
| 2002/0173354 A1 | 11/2002 | Winans |
| 2003/0235452 A1 | 12/2003 | Kraus |
| 2004/0056781 A1 | 3/2004 | Rix |
| 2004/0225502 A1 | 11/2004 | Bear |
| 2005/0017953 A1 | 1/2005 | Pekka |
| 2005/0170889 A1 | 8/2005 | Lum |
| 2005/0172045 A1 | 8/2005 | Bermudez et al. |
| 2005/0221894 A1 | 10/2005 | Lum |
| 2005/0243585 A1 | 11/2005 | Marchant |
| 2005/0247550 A1 | 11/2005 | Hamada |
| 2006/0068911 A1 | 3/2006 | Pirich |
| 2006/0080702 A1 | 4/2006 | Diez |
| 2006/0132458 A1 | 6/2006 | Garfio |
| 2006/0152628 A1 | 7/2006 | Park |
| 2006/0234794 A1 | 10/2006 | Baseflug et al. |
| 2006/0236002 A1 | 10/2006 | Valenci |
| 2006/0250351 A1 | 11/2006 | Fu |
| 2006/0256090 A1 | 11/2006 | Huppi |
| 2006/0286943 A1 | 12/2006 | Vance |
| 2007/0010328 A1 | 1/2007 | Yokota |
| 2007/0060363 A1 | 3/2007 | Nguyen |
| 2007/0091633 A1 | 4/2007 | Harrity |
| 2007/0152965 A1 | 7/2007 | Krzyzanowski |
| 2007/0155511 A1 | 7/2007 | Grundstedt |
| 2007/0233291 A1 | 10/2007 | Herde |
| 2007/0236959 A1 | 10/2007 | Tolbert |
| 2008/0045338 A1 | 2/2008 | Walker |
| 2008/0102960 A1 | 5/2008 | Jiao |
| 2008/0202907 A1 | 8/2008 | Kyowski |
| 2008/0261695 A1 | 10/2008 | Coe |
| 2008/0294453 A1 | 11/2008 | Baird-Smith |
| 2009/0065337 A1 | 3/2009 | Chiang |
| 2009/0077277 A1 | 3/2009 | Vidal |
| 2009/0219734 A1 | 9/2009 | Sawada |
| 2009/0258713 A1 | 10/2009 | Albouyeh |
| 2009/0284397 A1 | 11/2009 | Lee |
| 2010/0026646 A1 | 2/2010 | Xiao |
| 2010/0041480 A1 | 2/2010 | Wong |
| 2010/0067424 A1 | 3/2010 | Sun |
| 2010/0115050 A1 | 5/2010 | Sultenfuss |
| 2010/0137033 A1 | 6/2010 | Lee |
| 2010/0160048 A1 | 6/2010 | Rabin |
| 2010/0259498 A1 | 10/2010 | Harison |
| 2010/0271839 A1 | 10/2010 | Chan |
| 2011/0009195 A1 | 1/2011 | Porwal |
| 2011/0014984 A1 | 1/2011 | Penman et al. |
| 2011/0084904 A1 | 4/2011 | Tan |
| 2011/0241999 A1 | 10/2011 | Their |
| 2011/0252344 A1 | 10/2011 | Van Os |
| 2011/0256930 A1 | 10/2011 | Jaouen |
| 2011/0300934 A1 | 12/2011 | Toy |
| 2012/0007809 A1 | 1/2012 | Mahalingam |
| 2012/0145522 A1 | 6/2012 | Lee |
| 2012/0200475 A1 | 8/2012 | Baker |
| 2012/0220372 A1 | 8/2012 | Cheung |
| 2012/0225258 A1 | 9/2012 | Hill |
| 2012/0284302 A1 | 11/2012 | Takagi |
| 2013/0033829 A1 | 2/2013 | Furubo et al. |
| 2013/0053146 A1 | 2/2013 | Ikeda |
| 2013/0077346 A1 | 3/2013 | Chen |
| 2013/0079139 A1 | 3/2013 | Gray |
| 2013/0154958 A1 | 6/2013 | Clavin |
| 2013/0159928 A1 | 6/2013 | Joynes |
| 2013/0162680 A1 | 6/2013 | Perry |
| 2013/0165180 A1 | 6/2013 | Fukuda |
| 2013/0191625 A1 | 7/2013 | Mullens et al. |

(56) References Cited

U.S. PATENT DOCUMENTS

| | | |
|---|---|---|
| 2013/0222238 A1 | 8/2013 | Sliger |
| 2013/0225288 A1 | 8/2013 | Levin et al. |
| 2013/0237322 A1 | 9/2013 | Sobel |
| 2013/0249830 A1 | 9/2013 | Quek |
| 2013/0274018 A1 | 10/2013 | Zalewski |
| 2013/0298208 A1 | 11/2013 | Ayed |
| 2013/0303244 A1 | 11/2013 | Jensen |
| 2014/0018173 A1 | 1/2014 | Urhman |
| 2014/0024392 A1 | 1/2014 | Su |
| 2014/0109133 A1 | 4/2014 | Kitazato |
| 2014/0125619 A1 | 5/2014 | Panther et al. |
| 2014/0161417 A1 | 6/2014 | Kurupacheril |
| 2014/0184508 A1 | 7/2014 | Tamasi et al. |
| 2014/0206451 A1 | 7/2014 | Helmes |
| 2014/0274394 A1 | 9/2014 | Willis |
| 2014/0304494 A1 | 10/2014 | Hawver |
| 2014/0317329 A1 | 10/2014 | Barnett et al. |
| 2014/0365214 A1 | 12/2014 | Bayley |
| 2014/0375545 A1 | 12/2014 | Ackerman et al. |
| 2015/0018101 A1 | 1/2015 | Schoenith |
| 2015/0031452 A1 | 1/2015 | Rundell |
| 2015/0103015 A1 | 4/2015 | Berglund |
| 2015/0105152 A1 | 4/2015 | Bellinghausen |
| 2015/0128042 A1 | 5/2015 | Churchill et al. |
| 2015/0182856 A1 | 7/2015 | Mays, III |
| 2015/0185998 A1 | 7/2015 | Xing |
| 2015/0217191 A1 | 8/2015 | Yan |
| 2015/0231498 A1 | 8/2015 | Hain |
| 2015/0273325 A1 | 10/2015 | Falc et al. |
| 2015/0281422 A1 | 10/2015 | Kessler et al. |
| 2016/0062489 A1 | 3/2016 | Li |
| 2016/0089600 A1 | 3/2016 | Mays, III |
| 2016/0132114 A1 | 5/2016 | Rihn |
| 2016/0180811 A1 | 6/2016 | Colenbrander |
| 2016/0184712 A1 | 6/2016 | Colenbrander |
| 2016/0234264 A1 | 8/2016 | Coffman |
| 2016/0283063 A1 | 9/2016 | Missig |
| 2016/0313912 A1 | 10/2016 | Keam |
| 2016/0317919 A1 | 11/2016 | Gassoway et al. |
| 2016/0329533 A1 | 11/2016 | Tajima |
| 2016/0378226 A1 | 12/2016 | McCarthy, III |
| 2017/0056762 A1 | 3/2017 | Gafni |
| 2017/0072307 A1 | 3/2017 | Perry |
| 2017/0142201 A1 | 5/2017 | Holmes |
| 2017/0173461 A1 | 6/2017 | Pack |
| 2017/0189800 A1* | 7/2017 | Crain ............... A63F 13/24 |
| 2017/0205881 A1 | 7/2017 | Yamashita |
| 2017/0239468 A1 | 8/2017 | Lemke |
| 2017/0239569 A1 | 8/2017 | Shiraiwa |
| 2017/0340957 A1 | 11/2017 | Cochenour |
| 2017/0354878 A1 | 12/2017 | Posin |
| 2017/0354884 A1 | 12/2017 | Benedetto |
| 2018/0001216 A1 | 1/2018 | Bruzzo |
| 2018/0004250 A1 | 1/2018 | Barnett et al. |
| 2018/0056176 A1 | 3/2018 | Sakamoto |
| 2018/0056180 A1 | 3/2018 | Russell |
| 2018/0070389 A1 | 3/2018 | Morgan |
| 2018/0097860 A1 | 4/2018 | Daly |
| 2018/0104574 A1 | 4/2018 | Tager |
| 2018/0121655 A1 | 5/2018 | Abene |
| 2018/0133594 A1 | 5/2018 | Guo |
| 2018/0217662 A1 | 8/2018 | Smoot |
| 2018/0250588 A1 | 9/2018 | Winick |
| 2018/0280802 A1 | 10/2018 | Stroud |
| 2018/0345136 A1 | 12/2018 | Schmitz et al. |
| 2018/0345139 A1 | 12/2018 | Smith |
| 2018/0359246 A1 | 12/2018 | Dannemiller et al. |
| 2018/0369692 A1 | 12/2018 | Winick |
| 2019/0079584 A1 | 3/2019 | Bonanno et al. |
| 2019/0080549 A1 | 3/2019 | Lewis |
| 2019/0134499 A1 | 5/2019 | Lee |
| 2019/0230400 A1 | 7/2019 | Van Os |
| 2019/0286817 A1 | 9/2019 | Butler |
| 2019/0354183 A1 | 11/2019 | Swindells |
| 2019/0358534 A1 | 11/2019 | Fang et al. |
| 2019/0379231 A1 | 12/2019 | Gonzalez et al. |
| 2020/0026387 A1 | 1/2020 | Barel |
| 2020/0155928 A1 | 5/2020 | Guo |
| 2020/0206636 A1 | 7/2020 | Schultz et al. |
| 2020/0238181 A1 | 7/2020 | Fang |
| 2020/0278758 A1 | 9/2020 | McAllen |
| 2020/0282309 A1 | 9/2020 | Liao |
| 2020/0298110 A1 | 9/2020 | Koziel |
| 2020/0316463 A1 | 10/2020 | Itay |
| 2020/0346121 A1 | 11/2020 | Beaumont |
| 2020/0353351 A1 | 11/2020 | Mao |
| 2020/0353369 A1 | 11/2020 | Esselstrom |
| 2020/0406140 A1 | 12/2020 | Sundareson |
| 2021/0093951 A1 | 4/2021 | Mahlmeister et al. |
| 2021/0104907 A1 | 4/2021 | Chen |
| 2021/0126984 A1 | 4/2021 | Parekh |
| 2021/0154584 A1 | 5/2021 | O'Connor et al. |
| 2021/0197082 A1 | 7/2021 | Seibert et al. |
| 2021/0200501 A1 | 7/2021 | Stankoulov |
| 2021/0205699 A1 | 7/2021 | Chung |
| 2021/0275907 A1 | 9/2021 | Khaira et al. |
| 2021/0291062 A1 | 9/2021 | Tulewicz |
| 2021/0299553 A1 | 9/2021 | Lu et al. |
| 2021/0308566 A1 | 10/2021 | Kong et al. |
| 2021/0326145 A1 | 10/2021 | Wu |
| 2021/0349586 A1 | 11/2021 | Tsuchikawa |
| 2022/0032178 A1 | 2/2022 | Khaira et al. |
| 2022/0032179 A1 | 2/2022 | Khaira et al. |
| 2022/0032180 A1 | 2/2022 | Khaira et al. |
| 2022/0039280 A1 | 2/2022 | Guerrero, Jr. |
| 2022/0040573 A1 | 2/2022 | Fear |
| 2022/0096921 A1 | 3/2022 | Nielsen |
| 2022/0096923 A1 | 3/2022 | O'Leary et al. |
| 2022/0135273 A1 | 5/2022 | Malone |
| 2022/0233950 A1 | 7/2022 | Larson |
| 2022/0272432 A1 | 8/2022 | Schillebeeckx |
| 2022/0317798 A1 | 10/2022 | Stryker |
| 2022/0323857 A1 | 10/2022 | Khaira et al. |
| 2022/0331688 A1 | 10/2022 | Khaira et al. |
| 2022/0339533 A1 | 10/2022 | Schoenith |
| 2022/0347563 A1 | 11/2022 | Khaira et al. |
| 2022/0347564 A1 | 11/2022 | Khaira et al. |
| 2022/0382559 A1 | 12/2022 | Tu et al. |
| 2022/0395754 A1 | 12/2022 | Ballard |
| 2022/0401834 A1 | 12/2022 | Benedetto |
| 2023/0048793 A1 | 2/2023 | Lee |
| 2023/0068209 A1 | 3/2023 | Han |
| 2023/0085053 A1 | 3/2023 | Young |
| 2023/0092439 A1 | 3/2023 | Dang |
| 2023/0105605 A1 | 4/2023 | Lu et al. |
| 2023/0136977 A1 | 5/2023 | Miura |
| 2023/0182011 A1 | 6/2023 | Vroom et al. |
| 2023/0211235 A1 | 7/2023 | Xu |
| 2023/0256330 A1 | 8/2023 | Lu et al. |
| 2023/0271082 A1 | 8/2023 | Khaira et al. |
| 2023/0356076 A1 | 11/2023 | Maker |
| 2023/0421696 A1 | 12/2023 | Bohannon |
| 2024/0009564 A1 | 1/2024 | Schembri |
| 2024/0042313 A1 | 2/2024 | Benedetto |
| 2024/0070218 A1 | 2/2024 | Gazit |
| 2024/0149148 A1 | 5/2024 | O'Connor |
| 2024/0149151 A1 | 5/2024 | Chow |
| 2024/0149163 A1 | 5/2024 | O'Connor |
| 2024/0149174 A1 | 5/2024 | Donlan |
| 2024/0155033 A1 | 5/2024 | Wei |
| 2024/0157258 A1 | 5/2024 | Maker |
| 2024/0176483 A1 | 5/2024 | Peng |
| 2024/0207721 A1 | 6/2024 | O'Connor |
| 2024/0207722 A1 | 6/2024 | Maker |
| 2024/0207723 A1 | 6/2024 | Maker |
| 2024/0207724 A1 | 6/2024 | O'Connor |
| 2024/0207725 A1 | 6/2024 | O'Connor |
| 2024/0207729 A1 | 6/2024 | McDole |
| 2024/0226721 A1 | 7/2024 | Lake et al. |
| 2024/0299844 A1 | 9/2024 | Vroom et al. |
| 2024/0307760 A1 | 9/2024 | Aldridge et al. |
| 2024/0325878 A1 | 10/2024 | Poitrey |
| 2024/0333804 A1 | 10/2024 | Wei et al. |
| 2024/0390786 A1 | 11/2024 | Aldridge et al. |

(56)                References Cited

U.S. PATENT DOCUMENTS

| | | |
|---|---|---|
| 2025/0025773 A1 | 1/2025 | Maker |
| 2025/0025776 A1 | 1/2025 | Maker |
| 2025/0032900 A1 | 1/2025 | Khaira |
| 2025/0032901 A1 | 1/2025 | Boegli |
| 2025/0032903 A1 | 1/2025 | Khaira |
| 2025/0032904 A1 | 1/2025 | Khaira |
| 2025/0032913 A1 | 1/2025 | Abe |
| 2025/0041712 A1 | 2/2025 | Khaira |
| 2025/0058213 A1 | 2/2025 | Khaira et al. |
| 2025/0090945 A1 | 3/2025 | Koch et al. |
| 2025/0090946 A1 | 3/2025 | Koch et al. |
| 2025/0090947 A1 | 3/2025 | Khaira et al. |
| 2025/0099847 A1 | 3/2025 | Guerrero |
| 2025/0099848 A1 | 3/2025 | Yeo |
| 2025/0114691 A1 | 4/2025 | Poitrey |
| 2025/0128152 A1 | 4/2025 | Khaira et al. |
| 2025/0153035 A1 | 5/2025 | Torres et al. |
| 2025/0153045 A1 | 5/2025 | O'Connor et al. |
| 2025/0269271 A1 | 8/2025 | Lake et al. |
| 2025/0281827 A1 | 9/2025 | Maker |
| 2025/0352891 A1 | 11/2025 | Guerrero |

FOREIGN PATENT DOCUMENTS

| | | |
|---|---|---|
| CN | 204129699 U | 1/2015 |
| CN | 106356228 A | 1/2017 |
| CN | 107008005 A | 8/2017 |
| CN | 207532765 U | 6/2018 |
| CN | 207838250 U | 9/2018 |
| CN | 208115138 U | 11/2018 |
| CN | 109062842 A | 12/2018 |
| CN | 208636809 U | 3/2019 |
| CN | 209392718 U | 9/2019 |
| CN | 113426104 A | 9/2021 |
| CN | 115427123 A | 12/2022 |
| CN | 115427123 B | 2/2024 |
| EP | 1380324 A1 | 1/2004 |
| EP | 1380324 B1 | 9/2005 |
| EP | 2025369 A2 | 2/2009 |
| EP | 2136225 A1 | 12/2009 |
| EP | 2136225 B1 | 6/2012 |
| EP | 3224691 B1 | 4/2018 |
| EP | 3375502 A1 | 9/2018 |
| EP | 3782709 A1 | 2/2021 |
| EP | 4114540 A1 | 1/2023 |
| GB | 2608588 A | 1/2023 |
| JP | 2004139847 A | 5/2004 |
| JP | 2014210079 A | 11/2014 |
| JP | 2023516421 A | 4/2023 |
| TW | 201036020 A | 10/2010 |
| WO | WO2009/073819 | 6/2009 |
| WO | WO2015/072625 | 5/2015 |
| WO | WO2017/218303 | 12/2017 |
| WO | WO2021/102146 A1 | 5/2021 |
| WO | WO2021/178242 A1 | 9/2021 |
| WO | WO2022/161834 A1 | 8/2022 |
| WO | WO2023/034596 A1 | 3/2023 |
| WO | WO2023/172202 A1 | 9/2023 |
| WO | WO2024/006587 A1 | 1/2024 |
| WO | WO2024/097301 A1 | 5/2024 |
| WO | WO2024/107651 A1 | 5/2024 |
| WO | WO2024/107654 A2 | 5/2024 |
| WO | WO2024/137106 A1 | 6/2024 |
| WO | WO2024/148214 A1 | 7/2024 |
| WO | WO2024/248845 A1 | 12/2024 |
| WO | WO 2025/029566 A1 | 2/2025 |
| WO | WO2025/042684 A1 | 2/2025 |
| WO | WO2025/058942 A1 | 3/2025 |

OTHER PUBLICATIONS

US 12,047,455 B2, 07/2024, Wei et al. (withdrawn)
Office Action in U.S. Appl. No. 17/504,260, dated Jul. 23, 2024.
International Search Report and Written Opinion of the International Searching Authority issued in International Application No. PCT/US2024/019901, mailed Jul. 17, 2024 (15 pages).
Anonymous: "Using the wireless controller", Playstation 4 User's Guide, Mar. 15, 2023 (Mar. 15, 2023), pp. 1-3, XP093178521, Retrieved from the Internet: URL:https://web.archive.org/web/20230315012624/https://manuals.playstation.net/document/en/ps4/basic/usercontroller.html [retrieved on Jun. 5, 2024] the whole document, 3 pages.
U.S. Appl. No. 16/693,080, filed Nov. 2019, O'Connor.
U.S. Appl. No. 16/808,339, filed Mar. 2020, Khaira et al.
U.S. Appl. No. 17/504,260, filed Oct. 2021, Khaira.
U.S. Appl. No. 17/504,283, filed Oct. 2021, Khaira et al.
U.S. Appl. No. 17/504,299, filed Oct. 2021, Khaira.
U.S. Appl. No. 17/850,912, filed Jul. 2022, Khaira.
U.S. Appl. No. 17/856,895, filed Jul. 2022, Khaira.
U.S. Appl. No. 17/866,166, filed Jul. 2022, Khaira et al.
U.S. Appl. No. 17/866,234, filed Jul. 2022, Khaira et al.
U.S. Appl. No. 17/987,772, filed Nov. 2022, Sorensen.
U.S. Appl. No. 18/076,121, filed Dec. 2022, Donlan et al.
U.S. Appl. No. 18/076,146, filed Dec. 2022, Wei et al.
U.S. Appl. No. 18/076,172, filed Dec. 2022, Chow et al.
U.S. Appl. No. 18/086,077, filed Dec. 2022, Maker.
U.S. Appl. No. 18/086,103, filed Dec. 2022, Maker.
U.S. Appl. No. 18/136,509, filed Apr. 2023, O'Connor.
U.S. Appl. No. 18/138,377, filed Apr. 2023, Sorensen et al.
U.S. Appl. No. 18/195,152, filed May 2023, Khaira.
U.S. Appl. No. 18/202,755, filed May 2023, Aldridge et al.
U.S. Appl. No. 18/214,917, filed Jun. 2023, O'Connor.
U.S. Appl. No. 18/214,949, filed Jun. 2023, O'Connor.
U.S. Appl. No. 18/224,508, filed Jul. 2023, Maker.
U.S. Appl. No. 18/226,883, filed Jul. 2023, Khaira et al.
U.S. Appl. No. 18/226,892, filed Jul. 2023, Boegli.
U.S. Appl. No. 18/237,680, filed Aug. 2023, O'Connor.
U.S. Appl. No. 18/237,698, filed Aug. 2023, O'Connor.
U.S. Appl. No. 18/242,672, filed Sep. 2023, Aldridge et al.
U.S. Appl. No. 18/369,000, filed Sep. 2023, Koch et al.
U.S. Appl. No. 18/369,025, filed Sep. 2023, Koch et al.
U.S. Appl. No. 18/388,631, filed Nov. 2023, Khaira et al.
U.S. Appl. No. 18/388,636, filed Nov. 2023, Khaira et al.
U.S. Appl. No. 18/388,922, filed Nov. 2023, O'Connor et al.
U.S. Appl. No. 18/405,077, filed Jan. 2024, Lake et al.
U.S. Appl. No. 63/422,797, filed Nov. 2022, Khaira et al.
U.S. Appl. No. 63/425,655, filed Nov. 2022, Maker et al.
U.S. Appl. No. 63/435,089, filed Dec. 2022, O'Connor.
U.S. Appl. No. 63/437,580, filed Jan. 2023, Lake et al.
U.S. Appl. No. 63/452,551, filed Mar. 2023, Aldridge et al.
U.S. Appl. No. 63/524,014, filed Jun. 2023, O'Connor.
U.S. Appl. No. 63/530,230, filed Aug. 2023, Khaira et al.
U.S. Appl. No. 63/533,580, filed Aug. 2023, Khaira et al.
Office Action in CN Application No. 202180019131.2, dated Jul. 27, 2023.
Office Action in CN Application No. 202180019131.2, dated Mar. 28, 2023.
Office Action—Communication pursuant to Rules 161(1) and 162 EPC, dated Oct. 26, 2022.
Notice of allowance in U.S. Appl. No. 18/224,508, dated Jan. 24, 2024.
Office Action in U.S. Appl. No. 16/693,080, dated Jan. 25, 2021.
Office Action in U.S. Appl. No. 16/693,080, dated Jun. 8, 2021.
Office Action in U.S. Appl. No. 17/504,283, dated Feb. 13, 2024.
Office Action in U.S. Appl. No. 17/856,895, dated Jul. 18, 2023.
Office Action in U.S. Appl. No. 17/856,895, dated Nov. 1, 2023.
Office Action in U.S. Appl. No. 17/856,895, dated Oct. 27, 2022.
Office Action in U.S. Appl. No. 18/076,146, dated Dec. 12, 2023.
Office Action in U.S. Appl. No. 18/086,077, dated Apr. 17, 2023.
Office Action in U.S. Appl. No. 18/086,077, dated Aug. 17, 2023.
Office Action in U.S. Appl. No. 18/086,103, dated Dec. 7, 2023.
Office Action in U.S. Appl. No. 18/195,152, dated Aug. 4, 2023.
Office Action in U.S. Appl. No. 18/224,508, dated Oct. 3, 2023.
International Search Report and Written Opinion of the International Searching Authority issued in International Application No. PCT/US2021/019941, mailed Jun. 9, 2021 (12 pages).

(56) References Cited

OTHER PUBLICATIONS

International Search Report and Written Opinion of the International Searching Authority issued in International Application No. PCT/US2023/031919, mailed Nov. 17, 2023 (14 pages).
International Search Report and Written Opinion of the International Searching Authority, issued in International Application No. PCT/US2020/061291, mailed Feb. 24, 2021, 20 pages.
"AVPictureInPictureController: a controller that responds to user-initiated Picture in Picture playback of video in a floating, resizable window"; Apple Developer Documentation, AVKit; downloaded from the Internet on Nov. 27, 2022 at https://developer.apple.com/documentation/avkit/avpictureinpicturecontroller; Apple Inc.; 2022; 8 pages.
"Backbone—Next-Level Play"; Apple App Store preview; downloaded from the Internet on Nov. 29, 2022 at https://apps.apple.com/us/app/backbone-next-level-play/id1449660663; Apple Inc.; 2022; 4 pages.
"Backbone One"; Mobile gaming hardware product page; Backbone; Dec. 9, 2022; 7 pages.
"Digital Depth: ALL Controller Universal & Fully Customizable"; Kickstarter project page for customizable game controller; Digital Depth Inc.; Aug. 4, 2021; 25 pages.
"Displaying live data with Live Activities"; Apple Developer Documentation Activity Kit article; downloaded from the Internet on Nov. 28, 2022 at https://developer.apple.com/documentation/activitykit/displaying-live-data-with-live-activities; Apple Inc.; 2022; 37 pages.
"Game Center"; Apple Developer Game Center overview; downloaded from the Internet on Nov. 29, 2022 at https://developer.apple.com/game-center/; Apple Inc.; 2022; 4 pages.
"Gamepass App now supports Picture in Picture"; Reddit, xcloud comments; downloaded from the Internet on Nov. 28, 2022 at https://www.reddit.com/r/xcloud/comments/mvathi/gamepass_app_now_supports_picture_in_picture/; Reddit Inc.; 2022; 6 pages.
"GitHub—Kofktu/PIPKit: Picture in Picture for iOS"; downloaded from the Internet on Nov. 27, 2022 at https://github.com/Kofktu/PIPKit; GitHub, Inc.; 2022; 11 pages.
"How to implement Picture in Picture Webview on IOS Swift?"; StackOverflow Questions; downloaded from the Internet on Nov. 28, 2022 at https://stackoverflow.com/questions/69565199/how-to-implement-picture-in-picture-webview-on-ios-swift; StackOverflow; Oct. 14, 2021; 2 pages.
"PhoneJoy Play: Turn your phone into a console!"; Kickstarter project page for compact gamepad; PhoneJoy Solutions America, Inc.; Jul. 29, 2014; 42 pages.
"Picture-in-picture (PiP) support"; Android Developers UI Guide; downloaded from the Internet on Nov. 27, 2022 at https://developer.android.com/develop/ui/views/picture-in-picture; Nov. 11, 2022; 10 pages.
"Picture-in-Picture API—Web APIs / MDN"; downloaded from the Internet on Nov. 27, 2022 at https://developer.mozilla.org/en-US/docs/Web/API/Picture-in-Picture_API; Mozilla Corporation; Oct. 10, 2022; 4 pages.
"Pip (picture in picture) mode on android with the xbox game pass beta app"; Reddit, XboxGamePass comments; downloaded from the Internet on Nov. 29, 2022 at https://www.reddit.com/r/XboxGamePass/comments/n7f5bk/pip_picture_in_picture_mode_on_android_with_the/; Reddit Inc.; 2022; 6 pages.
"Rayz Pro"; Pioneer Rayz™ Pro earbuds product page; downloaded from the Internet on Aug. 16, 2023 at Rayz Pro Earphone—Pioneer Rayz; Pioneer Rayz; 2023; 9 pages.
"User Notifications: Push user-facing notifications to the user's device from a server, or generate them locally from your app"; Apple Developer Documentation; downloaded from the Internet on Nov. 28, 2022 at https://developer.apple.com/documentation/usernotifications; 2022; 16 pages.
"Why queue in geforce now so long? I try to answer for this question" Reddit, GeForceNOW comments; downloaded from the Internet on Jun. 7, 2023 at why queue in geforce now so long? I try to answer for this question : r/GeForceNOW (reddit.com); Reddit Inc.; Jun. 1, 2023; 6 pages.

Adler, M.; "Backbone One Review: Mobile gaming reenvisioned"; IGN review; downloaded from the Internet on Nov. 29, 2022 at https://www.ign.com/articles/backbone-one-review; IGN; Nov. 7, 2021; 18 pages.
Box.co.uk; "How Does the Samsung Gaming Hub Work?"; YouTube product tutorial; downloaded from the Internet on Nov. 29, 2022 at https://www.youtube.com/watch?v=uAT4tZR3mNk; YouTube; Oct. 2022; 5 pages.
Dickinson, "Instant Replay: Building a Game Engine with Reproducible Behavior," Jul. 13, 2001, Retrieved from the Internet: URL: http://www.gamasutra.com/features/20010713/dickinson_01.htm [retrieved on Oct. 2, 2007], 6 pages.
Faulkner, C.; "Backbone's excellent phone controller is now shipping for Android" The Verge, entertainment tech review webpage; downloaded from the Internet on Nov. 29, 2022 at https://www.theverge.com/2022/11/16/23462127/backbone-one-phone-controller-android-usb-c-features; Vox Media LLC; Nov. 16, 2022; 20 pages.
Faulkner, C.; "The Backbone One is a stunning controller that turns your iPhone into a more capable gaming device"; The Verge, entertainment tech review webpage; downloaded from the Internet on Nov. 29, 2022 at https://www.theverge.com/21525741/backbone-one-iphone-ios-controller-gaming-portable-review; Vox Media LLC; Apr. 27, 2021; 12 pages.
Hinton, L.; "Xbox Cloud Gaming 'Lots of people are playing' Fix: Why is queue taking so long? and How to fix Xbox Cloud Gaming 'Lots of people are playing' error"; downloaded from the Internet on Jun. 7, 2023 at Xbox Cloud Gaming 'Lots of people are playing' Fix: Why is queue taking so long?—GameRevolution; Game Revolution; Dec. 13, 2021; 6 pages.
Max Tech; Backbone One Review—The BEST iPhone Gaming Controller!; YouTube product review video; downloaded from the Internet on Nov. 29, 2022 at https://www.youtube.com/watch?v=zRJQjt2nzDo; YouTube; Jun. 2022; 4 pages.
Osterberg, J.; "Picture in Picture Across All Platforms"; Kodeco / iOS & Swift Tutorials; downloaded from the Internet on Nov. 28, 2022 at https://www.kodeco.com/24247382-picture-in-picture-across-all-platforms; Jul. 26, 2021; 14 pages.
Schofield, T.; "Logitech G Cloud Unboxing and Hands On!"; YouTube product review video; downloaded from the Internet on Nov. 29, 2022 at https://www.youtube.com/watch?v=speoPL5qX0; YouTube; Nov. 2022; 3 pages.
Sholtz, M.; "The Razer Kishi V2 offers a new Virtual Controller mode, and it's pretty slick"; Android Police Newsletter article; downloaded from the Internet on Aug. 16, 2023 at the Razer Kishi V2 offers a new Virtual Controller mode, and it's pretty slick (androidpolice.com); Jan. 21, 2023; 7 pages.
Tech & Design; "How to Set up New Nintendo Switch | Beginners Guide | First Time Turning on"; YouTube product review video; downloaded from the Internet on Nov. 29, 2022 at https://www.youtube.com/watch?v=XtMcQ9lAkCc; YouTube; 2021; 4 pages.
Vinyals et al., "Grandmaster level in StarCraft II using multi-agent reinforcement learning," Nature, Macmillan Journals Ltd., London, vol. 575, No. 7782, Oct. 30, 2019, pp. 350-354, 22 pages.
Voorhees, J.; "Deeper Controller Support and a Revitalized Game Center: Exploring Apple's 2020 Gaming Updates"; MacStories Weekly Extras; downloaded from the Internet on Nov. 29, 2022 at https://www.macstories.net/stories/deeper-controller-support-and-a-revitalized-game-center-exploring-apples-2020-gaming-updates/; MacStories, Inc.; Aug. 27, 2020; 14 pages.
Wagner, "Developing Your Own Replay System," Feb. 4, 2004, Retrieved from the Internet: URL: http://www.Jamasutra.com/features/20040204/wagner_01.shtml [retrieved on Oct. 9, 2007], 11 pages.
Notice of allowance in U.S. Appl. No. 17/504,283, dated May 29, 2024.
Notice of allowance in U.S. Appl. No. 17/504,299, dated Jun. 12, 2024.
Notice of allowance in U.S. Appl. No. 17/856,895, dated Jun. 12, 2024.
Notice of allowance in U.S. Appl. No. 18/076,146, dated Jun. 13, 2024.
Notice of allowance in U.S. Appl. No. 18/086,103, dated May 28, 2024.

(56)　　　　　References Cited

OTHER PUBLICATIONS

International Search Report and Written Opinion of the International Searching Authority issued in International Application No. PCT/US2023/079521, mailed May 24, 2024 (15 pages).
Office Action—Communication pursuant to Rules 161(1) and 162 EPC in Europe Application No. 23817600.2, dated Jun. 12, 2025.
Notice of allowance in U.S. Appl. No. 18/076,121, dated Jun. 23, 2025.
International Preliminary Report on Patentability in International Application No. PCT/US2023/081101, mailed Jul. 3, 2025.
International Preliminary Report on Patentability in International Application No. PCT/US2024/010404, mailed Jul. 17, 2025.
U.S. Appl. No. 19/068,177, filed Mar. 2025, Lake et al.
U.S. Appl. No. 19/096,915, filed Apr. 2025, Maker.
Notice of allowance in U.S. Appl. No. 18/136,509 dated Apr. 24, 2025.
Office Action in U.S. Appl. No. 18/076,121, dated Apr. 16, 2025.
Office Action in U.S. Appl. No. 18/076,172, dated May 12, 2025.
Office Action in U.S. Appl. No. 18/202,755, dated May 7, 2025.
Office Action in U.S. Appl. No. 18/226,883, dated Jun. 6, 2025.
Office Action in U.S. Appl. No. 18/226,892, dated Jun. 2, 2025.
International Preliminary Report on Patentability in International Application No. PCT/US2023/036609, mailed May 15, 2025.
International Preliminary Report on Patentability in International Application No. PCT/US2023/079518 mailed May 22, 2025.
International Preliminary Report on Patentability in International Application No. PCT/US2023/079521 mailed May 22, 2025.
International Search Report and Written Opinion of the International Searching Authority issued in International Application No. PCT/US2024/045554, mailed Dec. 12, 2024.
Retro Game Corps, "This Controller Could Change Mobile Gaming" (youtube.com), Oct. 3, 2024, obtained from the Internet on Oct. 10, 2024; URL: https://www.youtube.com/watch?v=J3969hkkFSE, 21 pages.
GameSir G8 Plus Bluetooth Mobile Controller—Big Enough as You Want—GameSir Official Store, obtained from the Internet on Oct. 10, 2024; URL: https://www.gamesir.hk/blogs/news/gamesir-g8-plus-bluetooth-mobile-controller-big-enough-as-you-want, 8 pages.
Kyle Bradshaw, GameSir G8 Galileo Review: the mobile controller I've dreamed of (9to5google.com), obtained from the Internet on Oct. 10, 2024; URL: https://9to5google.com/2024/01/25/review-gamesir-g8-galileo-android-ios/, 12 pages.
Nintendo Switch—Nintendo—Official Site, obtained from the Internet on Oct. 10, 2024; URL: https://www.nintendo.com/us/switch/system/, 17 pages.
Nintendo switch internal—Search Images (bing.com), obtained from the Internet on Oct. 10, 2024; URL: https://www.bing.com/images/search?view=detailV2&ccid=87gF12WI&id=31A64F955C01D87035FBF76FC2B1082808CDF4C2&thid=OIP.87gF12WIjRYTL2hDhEBZtQAAAA&mediaurl=https%3a%2f%2fwww.allaboutcircuits.com%2fuploads%2farticles%2fMouser_IA_Switch_figure5.jpg&cdnurl=https%3a%2f%2fth.bing.com%2fth%2fid%2fR.f3b805d765888d16132f6843844059b5%3frik%3dwvTNCCglscJv9w%26pid%3dImgRaw%26r%3d0&exph=355&expw=474&q=ninetnedo+switch+internal&simid=608038160133663134&FORM=IRPRST&ck=C6F7BED9A8A0BA549A06B2B38B157AFA&selectedIndex=1&itb=0&ajaxhist=0&ajaxserp=0, 4 pages.
U.S. Appl. No. 19/013,753, filed Jan. 2025, Khaira.
U.S. Appl. No. 63/743,503, filed Jan. 2025, Khaira.
Notice of allowance in U.S. Appl. No. 18/405,077, dated Dec. 26, 2024.
Notice of allowance in U.S. Appl. No. 18/405,077, dated Jan. 13, 2025.
Notice of allowance in U.S. Appl. No. 18/734,411 dated Jan. 13, 2025.
Office Action in U.S. Appl. No. 18/076,172, dated Jan. 10, 2025.
International Preliminary Reporty on Patentability in International Application No. PCT/US2023/031919, mailed Jan. 16, 2025.
U.S. Appl. No. 18/813,384, filed Aug. 2024, Maker.

U.S. Appl. No. 18/915,580, filed Oct. 2024, Khaira et al.
U.S. Appl. No. 18/915,648, filed Oct. 2024, Khaira et al.
U.S. Appl. No. 18/942,103, filed Nov. 2024, Scott et al.
U.S. Appl. No. 18/945,830, filed Nov. 2024, Khaira et al.
U.S. Appl. No. 18/962,755, filed Nov. 2024, Khaira et al.
U.S. Appl. No. 18/967,940, filed Dec. 2024, Khaira et al.
Notice of allowance in U.S. Appl. No. 17/504,260, dated Dec. 9, 2024.
Notice of allowance in U.S. Appl. No. 18/405,077, dated Dec. 12, 2024.
Office Action in U.S. Appl. No. 18/076,172, dated Dec. 2, 2024.
International Search Report and Written Opinion of the International Searching Authority issued in International Application No. PCT/US2024/039193, mailed Nov. 11, 2024 (16 pages).
International Search Report and Written Opinion of the International Searching Authority issued in International Application No. PCT/US2024/039487, mailed Nov. 18, 2024 (20 pages).
International Search Report and Written Opinion ofthe International Searching Authority issued in International Application No. PCT/US2024/042461, mailed Nov. 12, 2024 (13 pages).
Anonymous: "Chamfer", Wikipedia, Nov. 14, 2022 (Nov. 14, 2022), pp. 1-5, XP093219692, Retrieved from the Internet: URL:https://en.wikipedia.org/w/index.php?title=Chamfer&oldid=1121832130 page 3, 5 pages.
Anonymous: "Remote Play", Wikipedia, dated Jun. 30, 2023, XP093217737, Retrieved from the Internet: URL:https://en.wikipedia.org/w/index.php?title=Remote_Play&oldid=1162598770, 9 pages.
ROG Tessen Mobile Controller, Transform Your Game, Republic of Gamers, obtained from the Internet on Dec. 16, 2024, URL: https://rog.asus.com/controIlers/rog-tessen-mobile-controller/, 7 pages.
Office Action, Advisory Action, in U.S. Appl. No. 17/504,260, dated Nov. 14, 2024.
Walmart.com; search, obtained from the Internet on Nov. 17, 2024; URL: https://www.walmart.com/search?q=for+Apple+MagSafe+Charger%2C+Wireless+Charger+with+Fast+Charging+Capability%2C+Type+C+Wall+Charger%2C+Compatible+for+iPhone+and+AirPods; 3 pages.
M-Con; obtained from the Internet on Nov. 17, 2024; URL: https://www.m-con.co/; 6 pages.
Office Action in U.S. Appl. No. 17/856,895, dated Mar. 12, 2024.
International Search Report and Written Opinion of the International Searching Authority issued in International Application No. PCT/US2023/036609, mailed Feb. 12, 2024 (15 pages).
International Search Report and Written Opinion of the International Searching Authority issued in International Application No. PCT/US2023/079518, mailed Feb. 9, 2024 (12 pages).
Notice of allowance in U.S. Appl. No. 17/504,299, dated Apr. 15, 2024.
Notice of allowance in U.S. Appl. No. 18/076,146, dated Apr. 15, 2024.
Notice of allowance in U.S. Appl. No. 18/086,103, dated Mar. 25, 2024.
Notice of allowance in U.S. Appl. No. 18/086,103, dated Apr. 3, 2024.
Office Action in U.S. Appl. No. 17/504,260, dated Mar. 21, 2024.
Office Action in U.S. Appl. No. 17/504,299, dated Mar. 22, 2024.
Office Action in U.S. Appl. No. 18/195,152, dated Mar. 26, 2024.
International Search Report and Written Opinion of the International Searching Authority issued in International Application No. PCT/US2023/036567, mailed Mar. 11, 2024 (18 pages).
International Search Report and Written Opinion of the International Searching Authority issued in International Application No. PCT/US2023/081101, mailed Mar. 11, 2024 (19 pages).
Bluetooth Special Interest Group: "Bluetooth Human Interface Device (HID) Profile Specifications", Bluetooth Adopted Specification Web page, Feb. 21, 2012 (Feb. 21, 2012), pp. 1-123, XP055133797, Retrieved from the Internet: URL:https://www.bluetooth.org/en-us/specification/adopted-specifications [retrieved on Aug. 7, 2014].
U.S. Appl. No. 63/770,124, filed Mar. 2025, Khaira.
U.S. Appl. No. 63/781,523, filed Apr. 2025, Khaira.
Office Action in U.S. Appl. No. 18/086,077, dated Mar. 14, 2025.
Office Action in U.S. Appl. No. 18/136,509, dated Apr. 1, 2025.

(56)　　　　　References Cited

OTHER PUBLICATIONS

Jovanee, Alice, The new 8Bitdo Ultimate controller comes in October, https://www.theverge.com/2022/8/30/23326887/8bitdo-ulti mate-pro-control ler-bluetooth-preorder-nintendo-switch-wireless, Aug. 30, 2022 (Year: 2022), 3 pages.
Lon.tv, GameSir X2 USB-C Android Game Controller Review (Newest Version), https://www.youtube.com/watch?v=9sztm8D6qk,Nov. 24, 2021 (Year: 2021), 8 pages.
U.S. Appl. No. 18/734,411, filed Jun. 2024, Maker.
U.S. Appl. No. 18/777,919, filed Jul. 2024, Khaira et al.
U.S. Appl. No. 18/805,902, filed Aug. 2024, Khaira et al.
Notice of allowance in U.S. Appl. No. 17/504,283, dated Sep. 10, 2024.
Notice of allowance in U.S. Appl. No. 17/504,299, dated Sep. 10, 2024.
Notice of allowance in U.S. Appl. No. 17/856,895, dated Aug. 28, 2024.
Notice of allowance in U.S. Appl. No. 18/195,152, dated Aug. 30, 2024.
Notice of allowance in U.S. Appl. No. 18/224,508, dated Aug. 29, 2024.
Office Action in U.S. Appl. No. 18/405,077, dated Sep. 11, 2024.
Notice of allowance in U.S. Appl. No. 17/856,895, dated Apr. 16, 2024.
Office Action in U.S. Appl. No. 18/405,077, dated May 7, 2024.
International Search Report and Written Opinion of the International Searching Authority issued in International Application No. PCT/US2024/010404, mailed Apr. 24, 2024 (16 pages).
U.S. Appl. No. 18/746,611, filed Jun. 2024, Ivan Torres.
U.S. Appl. No. 18/739,527, filed Jun. 2024, Hong Tai Wei.
Notice of allowance in U.S. Appl. No. 18/076,146, dated Jul. 22, 2024.
Notice of allowance in U.S. Appl. No. 18/086,103, dated Jul. 9, 2024.
Notice of allowance in U.S. Appl. No. 18/195,152, dated Jul. 23, 2024.
Notice of allowance in U.S. Appl. No. 18/224,508, dated Jun. 21, 2024.
U.S. Appl. No. 19/068,177, entitled: "Open and Close Features for Game Controller Bridge", first named inventor: Jon Christopher Lake, filed Mar. 3, 2025.
U.S. Appl. No. 19/096,915, entitled: "Dynamically Changing Button Indicia for a Game Controller", first named inventor: Ozhan Maker, filed Apr. 1, 2025.
U.S. Appl. No. 19/318,687, entitled: "Contextually-Aware Platform Service Switcher", first named inventor: Joshua Donlan, filed Sep. 4, 2025.
U.S. Appl. No. 19/321,509, entitled: "Mobile Game Controller and Method for Connecting to a Wireless Audio Device", first named inventor: Samuel Boegli, filed Sep. 8, 2025.
U.S. Appl. No. 19/454,716, entitled: "Universal Mobile Game Controller", first named inventor: Shawn O'Connor, filed Jan. 21, 2026.
U.S. Appl. No. 19/454,733, entitled: "Universal Mobile Game Controller", first named inventor: Shawn O'Connor, filed Jan. 21, 2026.

Notice of allowance in U.S. Appl. No. 18/226,892, dated Aug. 29, 2025.
Notice of allowance in U.S. Appl. No. 18/237,680, dated Nov. 3, 2025.
Notice of allowance in U.S. Appl. No. 18/237,698, dated Oct. 22, 2025.
Office Action in U.S. Appl. No. 18/076,172, dated Sep. 2, 2025.
Office Action in U.S. Appl. No. 18/202,755, dated Oct. 23, 2025.
Office Action in U.S. Appl. No. 18/214,949, dated Mar. 9, 2026.
Office Action in U.S. Appl. No. 18/226,883, dated Dec. 1, 2025.
Office Action in U.S. Appl. No. 18/237,680, dated Aug. 7, 2025.
Office Action in U.S. Appl. No. 18/242,672, dated Oct. 27, 2025.
Office Action in U.S. Appl. No. 18/369,000, dated Jan. 22, 2026.
Office Action in U.S. Appl. No. 18/388,922, dated Sep. 30, 2025.
Office Action in U.S. Appl. No. 18/389,063, dated Mar. 20, 2026.
Office Action in U.S. Appl. No. 18/805,902, dated Mar. 26, 2026.
Office Action, Restriction Requirement, in U.S. Appl. No. 18/214,917, dated Dec. 30, 2025.
Office Action, Restriction Requirement, in U.S. Appl. No. 18/369,025, dated Mar. 9, 2026.
Office Action, Restriction Requirement, in U.S. Appl. No. 18/389,063, dated Oct. 27, 2025.
Office Action, Restriction Requirement, in U.S. Appl. No. 18/739,527, dated Dec. 31, 2025.
Office Action, Restriction Requirement, in U.S. Appl. No. 18/777,919, dated Mar. 25, 2026.
Joe Skrebels, Cyberpunk 2077 Xbox Controller Contains a Neat Easter Egg, Jul. 4, 2022, https://web.archive.org/web/20220704064405/https:/www.ign.com/articles/cyberpunk-2077-controller-soundtrack-qr-code-arg , pp. 1-2 (Year: 2022).
Lauryn Strampe, Review: Backbone One, Oct. 28, 2021, https://web.archive.org/web/2021 1028155054/https:/www.wired.com/review/backbone-one-iphone-controller/, pp. 1-8 (Year: 2021).
Lon. Tv, Backbone One Game Controller for iPhone Review, Jul. 7, 2021, https://www.youtube.com/watch?v=fv8qba1 niug , time 0:00-12:00, p. 1 (Year: 2021).
Luis Alamilla, TH IS Changes PS5 and XBOX Remote Play | Backbone One Controller Review, May 27, 2021, https://www.youtube.com/watch?v=tJrDhvy2Ffg, time 0:00-4:24, p. 1 (Year: 2021).
Peter Likes Photography and Cosplay, Backbone One iOS Review—Steam Link, PS Remote Play, and Xcloud tested, Oct. 17, 2021, https://www.youtube.com/watch?v=f3FfgXogToc, time 0:00-10:30, p. 1 (Year: 2021).
Reviews 2 Go, Control: Ultimate Edition—Cloud Version (Switch) Review, Nov. 2, 2020, https://www.youtube.com/watch?v=OeANrOtSSpw, time 0:00-8:54, p. 1 (Year: 2020).
Saunderverse, How to close out of a game/app on Nintendo Switch OLEO, Oct. 9, 2021, https://www.youtube.com/watch?v=9kZBfjUYiPg, time 0:00-0:48, p. 1 (Year: 2021).
Tech Tips, Nintendo Switch: How to Close a Game, Dec. 4, 2021, https://www.youtube.com/watch?v=m5FoRvN_5pM , time 0:00-1:01, p. 1 (Year: 2021).
Wesley Hilliard, Backbone One i Phone controller users get new features with optional subscription, Nov. 4, 2021, https://web.archive.org/web/20211104170551/https:/appleinsider.com/articles/21/11/04/backbone-one-iphone-controller-users-get-new-features-with-optional-subscription , pp. 1-4 (Year: 2021).

* cited by examiner

POSITION-ADJUSTABLE CONNECTOR FOR MOBILE DEVICE CONTROLLER

This application claims the benefit of U.S. Provisional Patent Application No. 63/425,655, filed Nov. 15, 2022, which is hereby incorporated by reference.

TECHNICAL FIELD

The subject matter is related to an apparatus and methods for connecting a mobile device to a gaming device, and, more particularly, to a system and methods for adjusting the height of a connector on a gaming device to accommodate mobile devices of varying dimensions.

BACKGROUND

The gaming world has recently seen handheld devices entering the market that interface with mobile devices, simulating the traditional console experience while playing on a mobile device. These handheld devices typically consist of two handles—mimicking the grip, button, and joystick configurations of traditional console controllers—and some mode of connecting the device through a mobile device's primary input port (e.g., lightning, USB-C, etc.). When the device is connected, a user can either run games locally on their mobile device or participate in cloud gaming and utilize the console-like controller for providing input, as opposed to the mobile device's own touchscreen or buttons.

The current devices on the market use connectors that are fixed in a position somewhere on the device, typically on the inner edge of one of the handles, and cannot be moved in any direction. Accordingly, a user must maneuver their mobile device and guide the input port to the location of the connector on the device and insert the connector. Although this process may appear simple, the wide variety of mobile device dimensions and protective cases can make inserting a completely stationary connector difficult. A mobile device with a length equal to or slightly longer than the maximum width of the gaming device, for example, may not fit within the device when considering the additional clearance needed to insert the connector. Or, alternatively, a mobile device with a particularly thick protective case may sit higher than the plane for inserting the connector.

Because the connectors on current market devices resist motion in any direction, attempts to overcome dimension difficulties while inserting a mobile device could lead to damage to either the connector or the input port on the mobile device itself. For instance, a user trying to overcome a thick protective case causing the mobile device to sit too high above the connector may try to force the connector into the input port, leading the connector to bend or break within the port.

Devices with comparable connectors, such as docking stations for mobile devices, have implemented flexible connectors that rotate about a hinge and change the approach angle. These flexible connectors allow a user to insert or remove a mobile device at an angle for easier access, but ultimately the connectors return to a single, default resting position on the docking station. Changing the approach angle does not fulfill the need described for mobile gaming devices. In fact, it is detrimental. Mobile devices must remain substantially flat on a gaming device for practical use, so the problems associated with varying dimensions and protective case sizes require the resting position to be adjustable, not the approach angle. Consequently, a device is needed that accommodates mobile device dimensions and protective cases over a wide range and limits the potential for damage while inserting a mobile device for game play.

Configurations of the disclosed technology address shortcomings in the prior art.

DETAILED DESCRIPTION

As described herein, aspects are directed to an adjustable connector for connecting a mobile device to a handheld gaming device. In configurations, the adjustable connector moves in a defined z-axis to accommodate mobile devices of varying dimensions and varying protective case sizes. Moving the connector along the z-axis allows a user to bring the connector to the same height as an input port on their mobile device when the mobile device lays substantially flat against the handheld gaming device, as is desired for gameplay. Accordingly, the user may easily insert the connector without bending, twisting, or forcing either the connector or the port on their mobile device. This mitigates the potential for damage and enhances the user experience, as it gives the user free range to switch mobile devices or protective cases as the user chooses without limiting the user's ability to game with the handheld gaming device. Aspects are now described in more detail.

Figure 1:
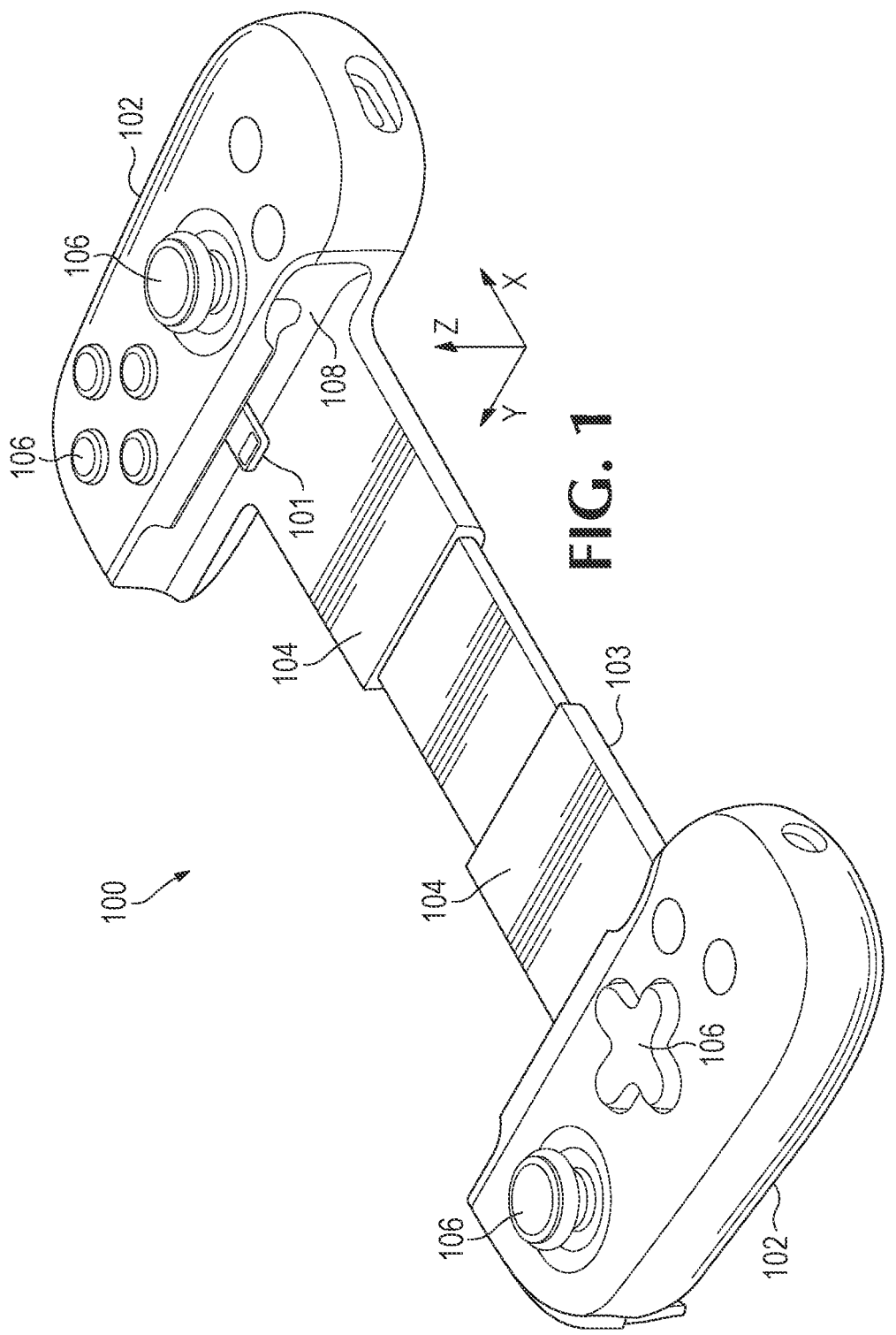
FIG. 1 is a perspective view of a gaming device with a position-adjustable connector, according to an example configuration.

As illustrated in FIG. 1, a gaming device 100 may include an adjustable connector 101, a set of two handles 102, and a bridge 103 connecting the handles 102. In configurations, the bridge 103 may be adjustable to vary the distance between the two handles 102. As illustrated, the bridge 103 includes a platform 104 for receiving a mobile device 105, and the adjustable connector 101 extends from one of the handles 102, generally but not always the one for the user's right hand, in the direction of the bridge 103. The adjustable connector 101 is positioned to be inserted into a user's mobile device 105 when the mobile device 105 is laid substantially flat against the platform 104 with an input port 107 of the mobile device 105 facing the adjustable connector 101. In configurations, the platform 104 may be magnetic to attract the mobile device 105 to the platform 104. Each handle 102 in the illustrated configuration includes user-accessible, hardware interfaces 106, such as one or more of a button, an analog stick, a touchscreen, a touchpad, a knob, a slider, a switch, a wheel, a dial, a directional pad, or another such feature configured to accept touch inputs from a user's finger or a stylus. The gaming device 100 may be, for example, the game controller for a mobile device 105 as disclosed in U.S. Pat. No. 11,389,721. As used in this disclosure, "mobile device 105" refers to a portable, hand-held computing device, such as a smartphone, tablet, or other comparable mobile device 105.

Figures 2, 3:
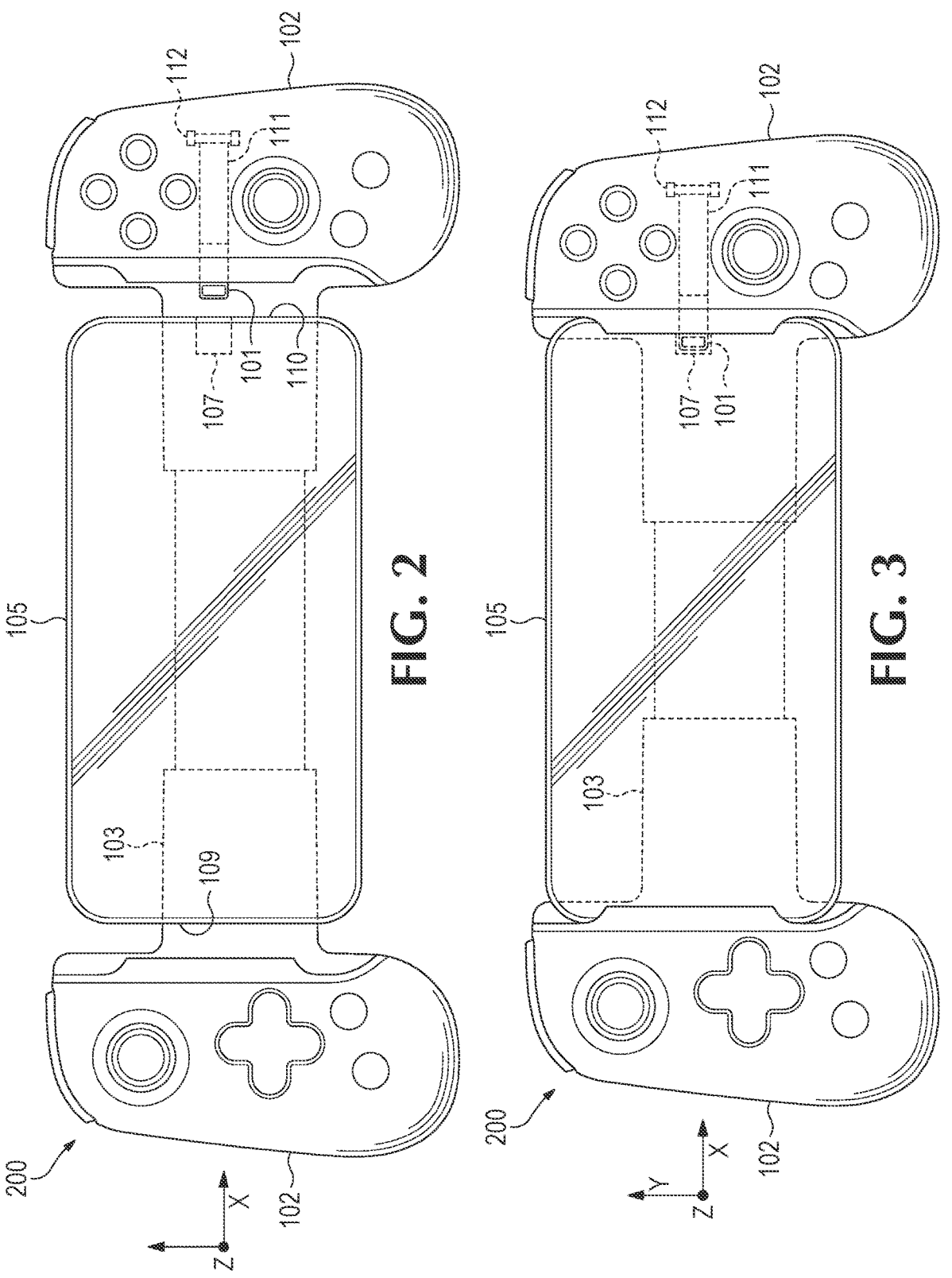
FIG. 2 is a front view of a gaming device, such as the gaming device of FIG. 1, with an example of a mobile device to be connected to the gaming device, according to an example configuration.
FIG. 3 is a front view of the gaming device of FIG. 2 with the example mobile device connected to the gaming device.
Figures 4, 5, 6:
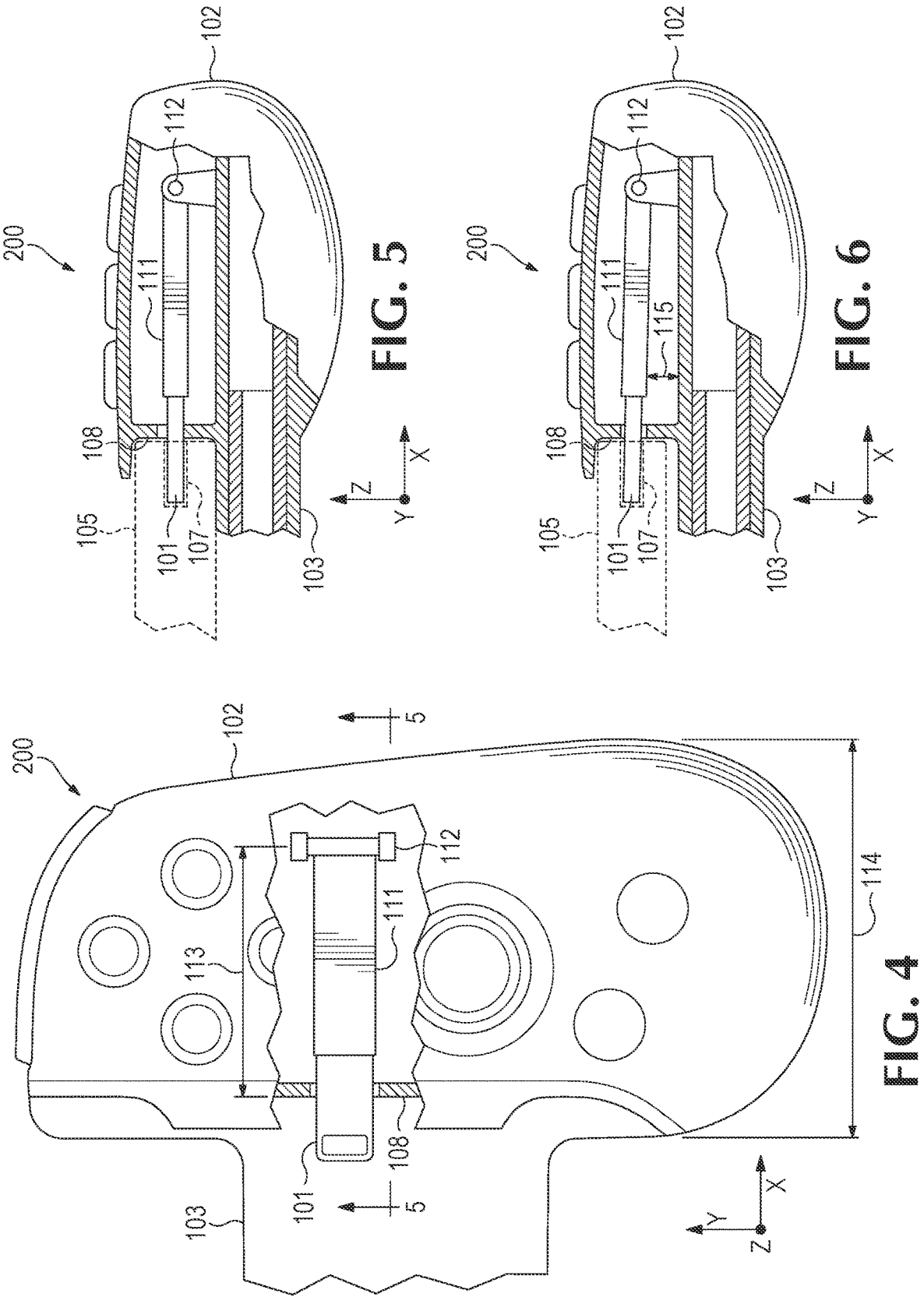
FIG. 4 is a detail, partial cutaway view of one of the handles of the gaming device of FIG. 2.
FIG. 5 is a bottom, partial sectional view of the handle of FIG. 4, illustrating use of the gaming device with a mobile device that is relatively thick.
FIG. 6 is a bottom, partial sectional view of the handle of FIG. 4, illustrating use of the gaming device with a mobile device that is relatively thin.

For the purposes of explaining features within this disclosure, a three-dimensional axis system is defined. As shown in the drawings, the x-axis is the direction that is substantially parallel to the longitudinal axis of the bridge 103; the y-axis is the direction substantially parallel to the contact surfaces 108 of the handles 102; and the z-axis is the direction in and out of the plane of FIGS. 2 and 3. As used in this context, "substantially parallel" means largely or essentially equidistant at all points, without requiring perfect parallelism. The contact surfaces 108 of the handles 102 are where the left edge 109 and right edge 110 of the mobile device 105 (in landscape position) contact the handles 102 when the mobile device 105 is installed in the gaming device 100, such as shown in FIG. 3. The z-axis, then, is generally toward or away from the user's face during typical use of the gaming device 100. The adjustable connector 101 is structured to move along the z-axis. Accordingly, when a user inserts the mobile device 105, the adjustable connector 101 may be moved up or down along the z-axis to meet the input port 107 of the mobile device 105 at its location on the z-axis. Preferably, the adjustable connector 101 is constrained to travel no more than four millimeters on the z-axis, making the maximum linear displacement of the adjustable connector 101 in the z-axis four millimeters. More preferably, the adjustable connector 101 is constrained to travel no more than three millimeters on the z-axis. Even more preferably, the adjustable connector 101 is constrained to travel no more than two millimeters on the z-axis.

This motion of the adjustable connector 101 along the z-axis occurs while substantially restricting motion in either the x-direction or y-direction. As used in this disclosure "substantially restricting" means largely or essentially hindering, without requiring perfect avoidance of all occurrences. In other words, the adjustable connector 101 may move up and down along the z-axis without twisting, bending, pushing, pulling, or otherwise shifting in other directions. Hence, motion of the adjustable connector 101 is constrained to the z-axis. As a result, the adjustable connector 101 allows for secure connection with mobile devices 105 of varying sizes.

To allow movement along the z-axis, the adjustable connector 101 illustrated in FIGS. 2-6 is structured as a cantilever. The gaming device 200 of FIGS. 2-6 may have the features of those discussed above for the gaming device 100 FIG. 1 in addition to those noted here.

In configurations, the adjustable connector 101 is attached to a substantially rigid arm 111. As used in this disclosure, "substantially rigid" means largely or essentially stiff and not pliant, without requiring perfect inflexibility. In configurations, the arm 111 may be made of metal, hard plastic, or any other substantially rigid material suitable for resisting movement in unwanted directions. As illustrated, the arm 111 is positioned inside a handle 102 of the gaming device 200. The adjustable connector 101 is coupled to one end of the arm 111, and the arm 111 is coupled to the handle 102 at the opposite end with a pivot 112. Accordingly, the adjustable connector 101 is configured to rotate about the pivot 112 with the arm 111, resulting in motion in the z-axis of the adjustable connector 101. Because of the pivoting motion, there may be some motion of the adjustable connector 101 in the x-axis as well as in the z-axis, but the motion in the z-axis is preferably at least five times greater than the motion of the adjustable connector 101 in the x-axis, which is accomplished in some configurations by having the pivot 112 be at least a minimum distance away from the adjustable connector 101.

As illustrated, the adjustable connector 101 extends from the contact surface 108 of the handle 102 in the x-direction. Movement of the adjustable connector 101 is constrained to be in the z-direction and to an amount not to exceed a maximum linear displacement, such as discussed above. Preferably, the pivot 112 is at least a distance equivalent to three times the maximum linear displacement away from the contact surface 108 so that movement of the adjustable connector 101 in the z-axis is substantially greater than movement of the adjustable connector 101 in the x-axis when the adjustable connector 101 rotates about the pivot 112 with the arm 111. Hence, if the maximum linear displacement of the adjustable connector 101 in the z-axis is three millimeters, the pivot 112 is preferably not less than fifteen millimeters away from the contact surface 108. The distance between the pivot 112 and the contact surface 108 is shown as the pivot distance 113 in FIG. 4. More preferably, the pivot 112 is at least a distance equivalent to five times the maximum linear displacement away from the contact surface 108. Even more preferably, the pivot 112 is at least a distance equivalent to ten times the maximum linear displacement away from the contact surface 108.

The handle 102 has a width 114 measured from the contact surface 108 in the x-axis. Preferably, the pivot 112 is located a distance of at least one-quarter the width 114 of the handle 102 away from the contact surface 108 so that movement of the adjustable connector 101 in the z-axis is substantially greater than movement of the adjustable connector 101 in the x-axis when the adjustable connector 101 rotates about the pivot 112 with the arm 111. More preferably, the pivot 112 is located a distance of at least half the width 114 of the handle 102 away from the contact surface 108. Even more preferably, the pivot 112 is located a distance of at least three-quarters the width 114 of the handle 102 away from the contact surface 108.

What is common for the two configurations just discussed is that the length of the arm 111 is significantly longer than the maximum linear displacement along the z-axis. Accordingly, only a minimal sweep angle 115 is required to complete the required displacement, making the component of displacement along the x-axis nearly imperceptible to the user. Preferably, the sweep angle 115 is less than about twenty degrees. More preferably, the sweep angle 115 is less than about ten degrees. Even more preferably, the sweep angle 115 is less than about five degrees. Hence sweep angle 115 does not significantly impact the entry angle of the adjustable connector 101 when it is inserted into the input port 107. In this way, configurations of the disclosure improve upon existing devices, such as docking stations, that utilize a hinge point much closer to a connector and largely vary the approach angle of the connector. In addition, for the two configurations just discussed the distance that the adjustable connector 101 extends from the contact surface 108 of the handle 102 in the x-direction does not significantly change; so any slight movement in the x-direction does not affect the fit of the mobile device 105 on the adjustable connector 101.

In configurations, the adjustable connector 101 may be biased to one extent or the other of its maximum linear displacement. For example, the adjustable connector 101 may be biased as far toward the bridge 103 as it is constrained to travel (i.e. all the way "down" in the z-axis relative to the view of FIGS. 5 and 6). As another example, the adjustable connector 101 may be biased as far away from the bridge 103 as it is constrained to travel (i.e. all the way "up" in the z-axis relative to the view of FIGS. 5 and 6). In such configurations, the adjustable connector 101 returns to its biased position when it is not connected to the input port 107 of the mobile device 105 or otherwise acted on by an outside force. The biasing may be accomplished by a spring mechanism, for example. Preferably, the adjustable connector 101 is biased all the way "up" in the z-axis. This biasing all the way "up" helps to ensure that relatively thin mobile devices 105 that do not have cases are pushed up and there is minimum difference between the surface of the screen of the mobile device 105 and the play surfaces where the input buttons (i.e. the user-accessible, hardware interfaces 106) are located. Accordingly, the screen of a relatively thin mobile device 105 of the type just noted (i.e. the thinnest expected scenario) would sit at about the same height as a screen of a relatively thick mobile device 105 having a case (i.e. the thickest expected scenario) when each is installed in the gaming device 200.

To connect a mobile device 105 to the gaming device 200 using the cantilever mechanism, such as depicted in FIGS. 2-6, the user lays the mobile device 105 flat against the platform 104. The user then brings the adjustable connector 101 up to the necessary height along the z-axis to be inserted into the input port 107. To the user, this motion is perceived as vertically lifting the adjustable connector 101, despite the user actually rotating the adjustable connector 101 about the pivot 112 within the handle 102. Because the rotational motion is imperceptible, the adjustable connector 101 remains relatively flat in the x-y plane of the gaming device 200 and thus connects with the input port 107 without bending within the input port 107. To disconnect the mobile device 105, the user simply pulls the adjustable connector 101 out of the input port 107. The mobile device 105 is then free to be removed from the platform 104 and taken out of the gaming device 200.

Configurations of the disclosure may implement what is referred to here as an elevator mechanism 116 rather than a cantilever. The gaming device 300 of FIGS. 7-9 may have the features of those discussed above for the gaming device 100 FIG. 1 in addition to those noted here.

Figures 7, 8, 9:
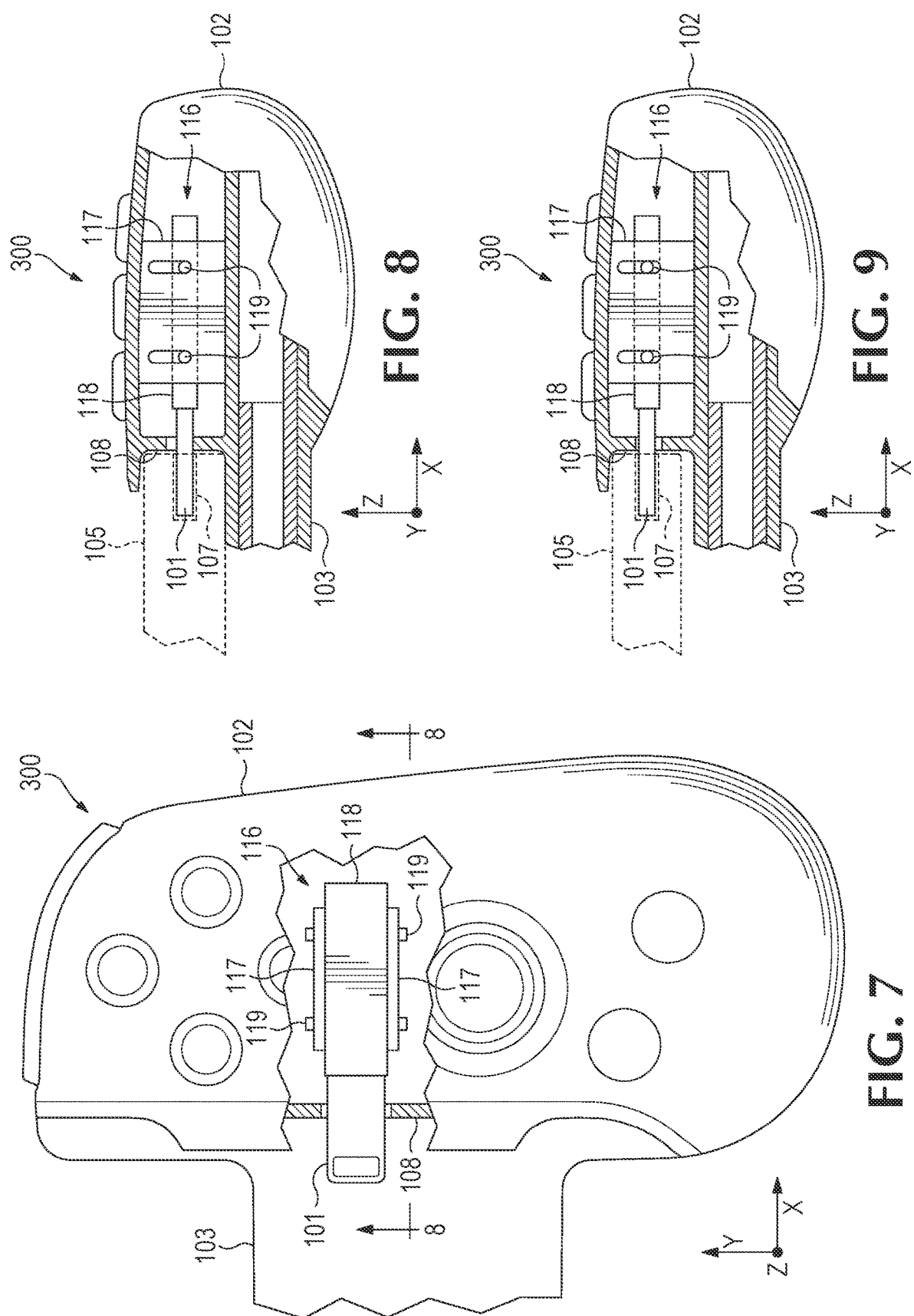
FIG. 7 is a detail, partial cutaway view of one of the handles of a gaming device, such as the gaming device of FIG. 1, with an example of a mobile device to be connected to the gaming device, according to another second example configuration.
FIG. 8 is a bottom, partial sectional view of the handle of FIG. 7, illustrating use of the gaming device with a mobile device that is relatively thick.
FIG. 9 is a bottom, partial sectional view of the handle of FIG. 7, illustrating use of the gaming device with a mobile device that is relatively thin.

As illustrated in FIGS. 7-9, in such configurations the adjustable connector 101 is coupled to a track 117, perhaps through a moveable bracket 118 that is slidably mounted in the track 117 at one or more contact points 119. The track 117 is structured to permit motion only along the z-axis. Accordingly, the moveable bracket 118, and hence the adjustable connector 101, is configured to translate in two directions along the z-axis of the track 117. The track 117 is positioned within the housing of one of the handles 102. As illustrated, the adjustable connector 101 extends from the contact surface 108 of the handle 102 in the x-direction, though the adjustable connector 101 may be mounted to the moveable bracket 118. In configurations, the moveable bracket 118 and track 117 may be made of metal, hard plastic, or any other substantially rigid material suitable for resisting movement in unwanted directions.

When connecting a mobile device 105 to the gaming device 300 having the elevator mechanism 116, a user lays the mobile device 105 flat against the platform 104 and raises the adjustable connector 101 to the necessary height on the z-axis by moving the moveable bracket 118 along the track 117. The user then inserts the adjustable connector 101 into the input port 107, and the moveable bracket 118 is maintained at its height along the z-axis. To disconnect, the user simply pulls the adjustable connector 101 from the input port 107 and removes the mobile device 105 from the platform 104.

In configurations, the track 117 may utilize high-friction materials tending to maintain the height of the moveable bracket 118 and adjustable connector 101 within the track 117 and only allow motion when force is applied. Accordingly, configurations may permit a user to maintain the adjustable connector 101 at a suitable height for the mobile device 105 for future uses, without having to readjust the adjustable connector 101 with every use of the gaming device 300. In other configurations, the adjustable connector 101 may be biased to one extent or the other of its permitted displacement. For example, the adjustable connector 101 may be biased as far toward the bridge 103 as it is constrained to travel (i.e. all the way "down" in the z-axis relative to the view of FIGS. 8 and 9). As another example, the adjustable connector 101 may be biased as far away from the bridge 103 as it is constrained to travel (i.e. all the way "up" in the z-axis relative to the view of FIGS. 8 and 9). In such configurations, the adjustable connector 101 returns to its biased position when it is not connected to the input port 107 of the mobile device 105 or otherwise acted on by an outside force. The biasing may be accomplished by a spring mechanism, for example.

Other variations of the position-adjustable connector for mobile device controller include an adjustable connector that pivots about a hinge where the adjustable connector is coupled to the contact surface of the handle. In another variation, the adjustable connector is coupled to the contact surface of the handle through a compliant material that permits movement of the adjustable connector. Both of these variations would permit mobile devices of varying thicknesses to be used with the gaming device.

An alternative to adjusting the position of the connector (as discussed above) is to change the mobile device's position. This can be achieved, for example, by adding or removing pads or other shims between the mobile device and the gaming device, thereby leveling the input port of the mobile device with the connector of the gaming device.

Configurations of the disclosure may utilize any appropriate type of data or power connector for the adjustable connector 101. Examples of the adjustable connector 101 include a Lightning male connector or a USB-C male connector.

In addition, while configurations were described in connection with a game controller, the disclosed technology is not limited in all configurations to use with game controllers. For example, the technology may be applied to docking stations for mobile devices.

EXAMPLES

Illustrative examples of the disclosed technologies are provided below. A particular configuration of the technologies may include one or more, and any combination of, the examples described below.

Example 1 includes a gaming device, comprising: a handheld controller with a handle; and a mechanism for connecting the handheld controller to a mobile device, comprising: a substantially rigid arm housed within the handle and configured to pivot about a pivot point within the handle, and a connector attached to the arm at the end opposite the pivot point and structured to physically and electrically pair the mobile device and the handheld controller, the connector structured to pivot about the pivot point with the arm.

Example 2 includes the gaming device of Example 1, in which the connector extends from a contact surface of the handle, in which the handle has a width in an x-direction measured from the contact surface, and in which the pivot point is located at least one-quarter the width of the handle away from the contact surface.

Example 3 includes the gaming device of Example 2, in which the pivot point is located at least half the width of the handle away from the contact surface.

Example 4 includes the gaming device of Example 2, in which the pivot point is located at least three-quarters the width of the handle away from the contact surface.

Example 5 includes the gaming device of any of Examples 1-4, in which the connector extends from a contact surface of the handle, and in which the connector is constrained to travel not more than a maximum linear displacement, in which the pivot point is located away from the contact surface at a distance not less than three times the maximum linear displacement.

Example 6 includes the gaming device of Example 5, in which the pivot point is located away from the contact surface at a distance not less than five times the maximum linear displacement.

Example 7 includes the gaming device of Example 5, in which the pivot point is located away from the contact surface at a distance not less than ten times the maximum linear displacement.

Example 8 includes the gaming device of any of Examples 1-7, in which the connector is constrained to travel no more than three millimeters when pivoting about the pivot point with the arm.

Example 9 includes the gaming device of any of Examples 1-8, in which the handle is a first handle, the handheld controller further comprising: a second handle; and a bridge connecting the first handle and the second handle.

Example 10 includes a gaming device, comprising: a handheld controller, structured to connect with a mobile device; a track within a handle of the handheld controller; and a connector for physically and electrically pairing the mobile device and gaming device, the connector being coupled to the track and configured to translate along an axis of the track in a first direction and in a second direction, the second direction being opposite the first direction.

Example 11 includes the gaming device of Example 10, further comprising a bracket slidably mounted to the track and configured to translate in the first direction and in the second direction along the axis of the track, in which the connector is coupled to the track through the bracket.

Example 12 includes the gaming device of any of Examples 10-11, in which the connector extends from a contact surface of the handle.

Example 13 includes the gaming device of any of Examples 10-12, further comprising a spring mechanism to bias the connector in the first direction.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "right," and "left" are used for convenience and in reference to the views provided in figures. But the device may have a number of orientations in actual use. Thus, a feature that is vertical, horizontal, to the right, or to the left in the figures may not have that same orientation or direction in actual use.

Although specific example configurations have been described for purposes of illustration, it will be understood that various modifications may be made without departing from the spirit and scope of the disclosure.

We claim:

1. A gaming device, comprising:
   a handheld controller with a handle; and
   a mechanism for connecting the handheld controller to a mobile device, comprising:
      an arm housed within the handle and configured to pivot about a pivot point within the handle, and
      a connector attached to the arm at the end opposite the pivot point and structured to physically and electrically pair the mobile device and the handheld controller, the connector structured to pivot about the pivot point with the arm.

2. The gaming device of claim 1, in which the connector extends from a contact surface of the handle, in which the handle has a width in an x-direction measured from the contact surface, and in which the pivot point is located at least one-quarter the width of the handle away from the contact surface.

3. The gaming device of claim 2, in which the pivot point is located at least half the width of the handle away from the contact surface.

4. The gaming device of claim 2, in which the pivot point is located at least three-quarters the width of the handle away from the contact surface.

5. The gaming device of claim 1, in which the connector extends from a contact surface of the handle.

6. The gaming device of claim 1, in which the connector is constrained to travel no more than three millimeters when pivoting about the pivot point with the arm.

7. The gaming device of claim 1, in which the handle is a first handle, the handheld controller further comprising:
   a second handle; and
   a bridge connecting the first handle and the second handle.

8. A game controller comprising:
   a handle;
   an arm housed within the handle and configured to pivot about a pivot point within the handle, and
   a connector attached to the arm at an end opposite the pivot point and structured to physically and electrically connect with a mobile device, wherein the connector is further structured to pivot about the pivot point with the arm.

9. The game controller of claim 8, wherein:

the connector extends from a contact surface of the handle;

the handle has a width in an x-direction measured from the contact surface; and the pivot point is located at least one-quarter the width of the handle away from the contact surface.

10. The game controller of claim 9, wherein the pivot point is located at least half the width of the handle away from the contact surface.

11. The game controller of claim 9, wherein the pivot point is located at least three-quarters the width of the handle away from the contact surface.

12. The game controller of claim 8, wherein:

the connector extends from a contact surface of the handle.

13. The game controller of claim 8, wherein the connector is constrained to travel no more than three millimeters when pivoting about the pivot point with the arm.

14. The game controller of claim 9, wherein the handle comprises a first handle, and wherein the game controller further comprises:

a second handle; and a bridge connecting the first handle and the second handle.

\* \* \* \* \*